United States Patent
Yasuda et al.

(10) Patent No.: US 10,615,614 B2
(45) Date of Patent: Apr. 7, 2020

(54) CHARGE/DISCHARGE CONTROL CIRCUIT AND BATTERY APPARATUS HAVING THE SAME

(71) Applicant: ABLIC Inc., Chiba-shi, Chiba (JP)

(72) Inventors: Kazuhide Yasuda, Chiba (JP); Takashi Ono, Chiba (JP)

(73) Assignee: ABLIC INC., Chiba (JP)

(*) Notice: Subject to any disclaimer, the term of this patent is extended or adjusted under 35 U.S.C. 154(b) by 140 days.

(21) Appl. No.: 15/986,173

(22) Filed: May 22, 2018

(65) Prior Publication Data

US 2018/0342880 A1  Nov. 29, 2018

(30) Foreign Application Priority Data

May 26, 2017  (JP) ................. 2017-105059
Mar. 27, 2018  (JP) ................. 2018-060316

(51) Int. Cl.
*H02J 7/00*  (2006.01)

(52) U.S. Cl.
CPC .......... *H02J 7/0021* (2013.01); *H02J 7/0013* (2013.01); *H02J 7/0026* (2013.01); *H02J 7/0072* (2013.01)

(58) Field of Classification Search
CPC ...... H02J 7/1423; H02J 7/0024; H02J 7/0021; H02J 7/0072; H02J 7/0018; H02J 7/0019; Y02E 60/12; Y02T 10/7005; Y02T 10/7055
USPC .......................................................... 320/126
See application file for complete search history.

(56) References Cited

U.S. PATENT DOCUMENTS

| | | | |
|---|---|---|---|
| 6,340,880 B1* | 1/2002 | Higashijima | H02J 7/0031 320/134 |
| 2006/0284597 A1 | 12/2006 | Takahashi | |
| 2016/0094065 A1* | 3/2016 | Motoichi | H02J 7/0021 320/126 |

FOREIGN PATENT DOCUMENTS

JP  2006-345660  12/2006

* cited by examiner

*Primary Examiner* — Richard Isla
*Assistant Examiner* — Mohammed J Sharief
(74) *Attorney, Agent, or Firm* — Brinks Gilson & Lione

(57) ABSTRACT

There are provided a charge/discharge control circuit which is equipped with a differential amplifier configured to detect charging currents of a plurality of secondary batteries connected in parallel, and a charge control circuit configured to output an output signal of the differential amplifier to charge control terminals according to a reception of a control signal to permit the charging of each of the secondary batteries, and which is capable of charging the secondary batteries connected in parallel with uniform charging currents, and a battery apparatus equipped with the charge/discharge control circuit.

6 Claims, 3 Drawing Sheets

CHARGE/DISCHARGE CONTROL CIRCUIT AND BATTERY APPARATUS HAVING THE SAME

RELATED APPLICATIONS

This application claims priority under 35 U.S.C. § 119 to Japanese Patent Application Nos. 2017-105059 filed on May 26, 2017 and 2018-060316 filed Mar. 27, 2018, the entire content of which are hereby incorporated by reference.

BACKGROUND OF THE INVENTION

Field of the Invention

The present invention relates to a charge/discharge control circuit and a battery apparatus having the same.

Background Art

A protection circuit of a related art battery apparatus in which a plurality of secondary batteries are connected in parallel is configured to prevent an inrush current flowing from the secondary battery having a high voltage to the secondary battery having a low voltage upon connection of the secondary batteries in parallel so as to protect the secondary batteries (refer to, for example, Japanese Patent Application Laid-Open No. 2006-345660).

SUMMARY OF THE INVENTION

The protection circuit of the related art battery apparatus is, however, capable of protecting the secondary batteries from overcurrent, but charging of the secondary batteries connected in parallel with proper charging currents respectively is not taken into consideration.

The present invention aims to provide a charge/discharge control circuit and a battery apparatus having the charge/discharge control circuit capable of charging the secondary batteries with uniform charging currents, even if a difference occurs in capacitance value or impedance value between a plurality of secondary batteries connected in parallel.

There is provided a charge/discharge control circuit according to one aspect of the present invention, for controlling charging and discharging of the first and the second secondary batteries connected in parallel, the charge/discharge control circuit includes a positive power supply terminal to which positive terminals of the first and second secondary batteries are connected, a first negative power supply terminal to which a negative terminal of the first secondary battery is connected, a second negative power supply terminal to which a negative terminal of the second secondary battery is connected, a first charge control terminal from which a signal controlling the charging of the first secondary battery is provided, a second charge control terminal from which a signal controlling the charging of the second secondary battery is provided, a voltage monitor terminal connected to an external negative terminal to which negative electrodes of a load and a charger are connected, a first voltage input terminal connected to one end of a first resistor through which a current of the first secondary battery flows, the first resistor having another end connected to the external negative terminal, a second voltage input terminal connected to one end of a second resistor through which a current of the second secondary battery flows, the second resistor having another end connected to the external negative terminal, a voltage detection circuit which outputs a control signal controlling the charging and discharging according to voltages of the positive power supply terminal, the first negative power supply terminal, and the second negative power supply terminal, a differential amplifier having a first input terminal to which the first voltage input terminal is connected, and a second input terminal to which the second voltage input terminal is connected, an output circuit which has an input terminal to which an output terminal of the differential amplifier is connected, and outputs a first signal supplied to the first charge control terminal and a second signal supplied to the second charge control terminal, and a charge control circuit which outputs the first and second signals to the first charge control terminal and the second charge control terminal, based on the first and second signals supplied from the output circuit and the control signal supplied from the voltage detection circuit, and in which according to a reception of a control signal to permit the charging from the voltage detection circuit and a detection based on a voltage of the voltage monitor terminal that the charger is connected, the charge control circuit outputs the first signal supplied by the output circuit to the first charge control terminal and outputs the second signal supplied by the output circuit to the second charge control terminal.

Further, there is provided a battery apparatus according to another aspect of the present invention, having first and second secondary batteries connected in parallel, the battery apparatus includes a charge/discharge control circuit according to claim 1 which controls charging and discharging of the first and second secondary batteries, a first charge control FET which controls the charging of the first secondary battery controlled by the charge/discharge control circuit, and a second charge control FET which controls the charging of the second secondary battery controlled by the charge/discharge control circuit.

According to a charge/discharge control circuit of the present invention and a battery apparatus having the same, even if a difference occurs in impedance value between the secondary batteries connected in parallel, charging with a desired charging current can be made. Further, it is possible to charge the secondary batteries connected in parallel with charging currents corresponding to their capacitance values.

DETAILED DESCRIPTION OF THE EMBODIMENTS

Embodiments of the present invention will hereinafter be described with reference to the accompanying drawings.

Figure 1:
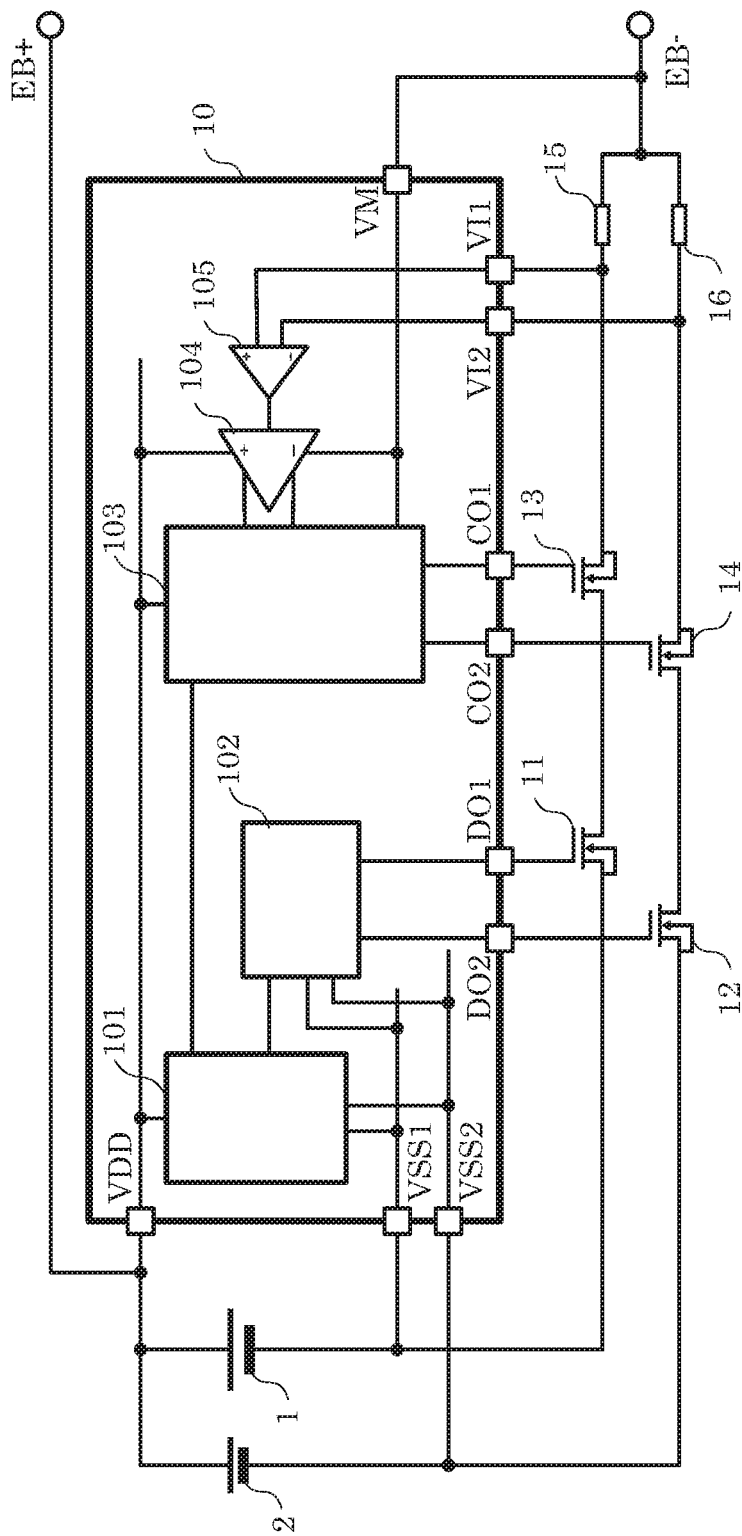
FIG. 1 is a block diagram illustrating a battery apparatus according to a first embodiment of the present invention.

FIG. 1 is a block diagram illustrating a battery apparatus according to a first embodiment of the present invention.

The battery apparatus according to the present embodiment is equipped with secondary batteries 1 and 2, a charge/discharge control circuit 10, discharge control FETs 11 and 12, charge control FETs 13 and 14, resistors 15 and 16, and an external positive terminal EB+ and an external negative terminal EB− to which a charger and a load (both not illustrated) are connected.

The charge/discharge control circuit 10 is equipped with a voltage detection circuit 101, a discharge control circuit 102, a charge control circuit 103, a differential amplifier 105, an output circuit 104, a positive power supply terminal VDD, negative power supply terminals VSS1 and VSS2, discharge control terminals DO1 and DO2, charge control terminals CO1 and CO2, voltage input terminals VI1 and VI2, and a voltage monitor terminal VM.

The voltage detection circuit 101 monitors overcharging and overdischarging of the secondary batteries 1 and 2 from voltages of the positive power supply terminal VDD and the negative power supply terminals VSS1 and VSS2. The discharge control circuit 102 controls the discharge control FETs 11 and 12 with of the positive power supply terminal VDD and the voltages of the negative power supply terminals VSS1 and VSS2 according to a signal input from the voltage detection circuit 101. The charge control circuit 103 controls the charge control terminals CO1 and CO2 with the voltage of the positive power supply terminal VDD and a voltage of the voltage monitor terminal VM according to a signal input from the voltage detection circuit 101.

Here, signals output from the discharge control circuit 102 which controls the discharge control FETs 11 and 12 may be common or different.

Next a description of charging operation of the battery apparatus is made below.

The charger is connected between the external positive terminal EB+ and the external negative terminal EB−. The charge control FETs 13 and 14 and the discharge control FETs 11 and 12 are all on, and thereby a charging current flows to each of the secondary batteries 1 and 2. The charging current flowing through the secondary battery 1 flows through the resistor 15 and generates a voltage at one end of the resistor 15 whose the other end is connected to the external negative terminal EB−. The charging current flowing through the secondary battery 2 flows through the resistor 16 and generates a voltage at one end of the resistor 16 whose the other end is connected to the external negative terminal EB−. At this time, since the other ends of the resistors 15 and 16 are connected in common, the difference between the voltages generated at the one ends thereof is equal to the difference between the charging currents.

The voltage generated at the one end of the resistor 15 is provided to the voltage input terminal VI1, i.e., a non-inversion input terminal of the differential amplifier 105. The voltage generated at the one end of the resistor 16 is provided to the voltage input terminal VI2, i.e., an inversion input terminal of the differential amplifier 105. The differential amplifier 105 amplifies the difference between the voltage of the voltage input terminal VI1 and the voltage of the voltage input terminal VI2 and supplies the resultant voltage to the output circuit 104. According to the polarity of the signal provided from the differential amplifier 105 the output circuit 104 outputs a control signal for the charge control FET14 on the positive signal and outputs a control signal for the charge control FET13 on the negative signal, respectively.

When a charge permission signal is input from the voltage detection circuit 101, the charge control circuit 103 outputs the voltage of the positive power supply terminal VDD to the charge control terminals CO1 and CO2 to turn on the charge control FET13 and the charge control FET14.

At this time, when the charger is connected between the external positive terminal EB+ and the external negative terminal EB−, the charge control circuit 103 switches the voltage of the positive power supply terminal VDD to the signals input from the output circuit 104 and outputs the same to the charge control terminals CO1 and CO2.

That is, since the charge control FET13 and the charge control FET14 are controlled by the control signals based on the charging currents flowing to the secondary battery 1 and the secondary battery 2, which are output from the output circuit 104, the charging currents flowing to the secondary battery 1 and the secondary battery 2 become equal to each other.

Further, when a charge prohibition signal is input from the voltage detection circuit 101, the charge control circuit 103 outputs the voltage of the voltage monitor terminal VM to the charge control terminals CO1 and CO2 to turn off the charge control FET13 and the charge control FET14.

According to the present embodiment as described above, the charge control FET13 and the charge control FET14 are controlled by the control signals based on the charging currents flowing to the secondary battery 1 and the secondary battery 2, which are output from the output circuit 104. Therefore, even if there occurs a difference in capacitance value or impedance value between the secondary batteries connected in parallel, they can be charged with the uniform charging currents. Thus, it is possible to provide a safe battery apparatus which prevents the occurrence of such a malfunction that the charging current of either of the secondary batteries exceeds a rated current.

Incidentally, although the differential amplifier 105 has amplified the difference in voltage between the voltage input terminal VI1 and the voltage input terminal VI2 and output the same therefrom in the present embodiment, for example, a comparator can also be used instead.

Figure 2:
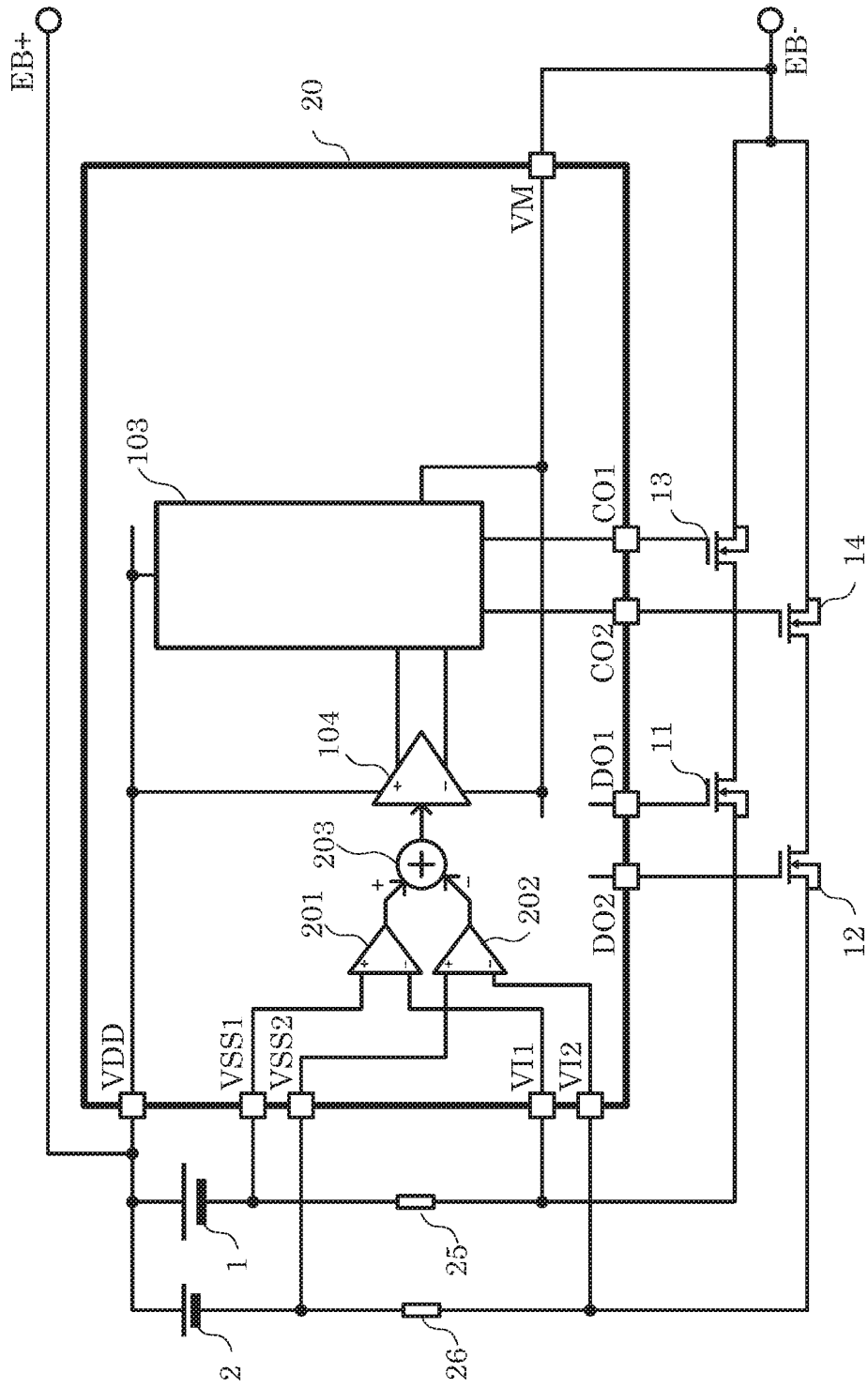
FIG. 2 is a block diagram illustrating a battery apparatus according to a second embodiment of the present invention.

FIG. 2 is a block diagram illustrating a battery apparatus according to a second embodiment of the present invention.

The battery apparatus according to the present embodiment is different from the battery apparatus according to the first embodiment in the following points.

In the battery apparatus according to the second embodiment, a resistor 25 is connected between a secondary battery 1 and a discharge control FET11, and a resistor 26 is connected between a secondary battery 2 and a discharge control FET12.

Since the present battery apparatus is identical in other configuration to the battery apparatus illustrated in FIG. 1, the same components are denoted by the same reference numerals, and their dual description will be omitted. Further, the discharge control circuit 102 will also be omitted.

The present battery apparatus is almost similar in operation to the battery apparatus according to the first embodiment, but there is no terminal to which the resistors 25 and 26 are connected in common. The present embodiment is hence different from the first embodiment in terms of a circuit which outputs a difference between respective voltages generated across the resistors 25 and 26 to an output circuit 104.

A charge/discharge control circuit 20 is equipped with a differential amplifier 201, a differential amplifier 202, and an addition circuit 203 which serve as an analog addition processing circuit. The differential amplifier 201 amplifies a voltage developed across the resistor 25 and outputs the same therefrom. The differential amplifier 202 amplifies a voltage developed across the resistor 26 and outputs the same therefrom. The addition circuit 203 subtracts the output voltage of the differential amplifier 202 from the output voltage of the differential amplifier 201 and outputs a result of its subtraction to the output circuit 104. Subsequent operations are the same as those in the battery apparatus according to the first embodiment.

With such a configuration, even if there occurs a difference in capacitance value or impedance value between the secondary batteries connected in parallel, they can be charged with uniform charging currents.

Even in the present embodiment as described above, an advantageous effect similar to that of the first embodiment can be obtained.

Figure 3:
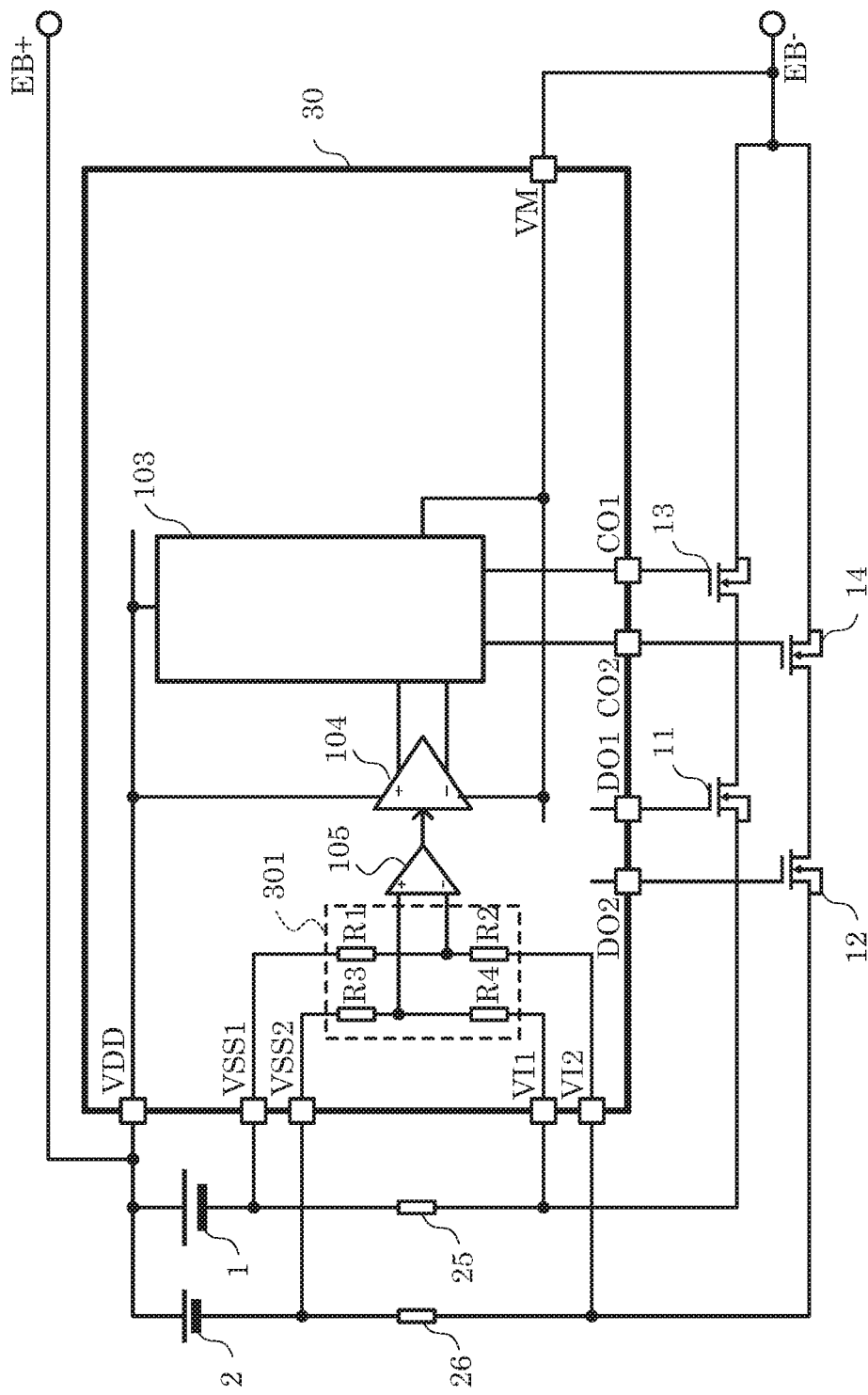
FIG. 3 is a block diagram illustrating a battery apparatus according to a second example of the second embodiment of the present invention.

FIG. 3 illustrates a block diagram of a battery apparatus according to a second example of the second embodiment.

The battery apparatus illustrated in FIG. 3 is different from the battery apparatus illustrated in FIG. 2 in the following points. Incidentally, since the battery apparatus illustrated in FIG. 3 is the same as the battery apparatus illustrated in FIG. 2 in terms of configurations other than the following points, the same components are denoted by the same reference numerals, and their dual description will be omitted.

A charge/discharge control circuit 30 is equipped with a voltage difference detection circuit 301. The voltage difference detection circuit 301 has resistors R1 and R2 connected in series between a negative power supply terminal VSS1 and a voltage input terminal VI2, resistors R3 and R4 connected in series between a negative power supply terminal VSS2 and a voltage input terminal VI1, a first output terminal being a connecting point of the resistors R1 and R2, and a second output terminal being a connecting point of the resistors R3 and R4. The first output terminal is connected to an inversion input terminal of a differential amplifier 105, and the second output terminal is connected to a non-inversion input terminal of the differential amplifier 105.

Assuming that in the voltage difference detection circuit 301 configured as described above, the resistance values of the four resistors are all equal to each other and made sufficiently larger than those of resistors 25 and 26, a voltage V301 between the first output terminal and the second output terminal is expressed by the following equation:

$$V301 \approx (V25-V26)/2$$

where V25 is a voltage across the resistor 25, and V26 is a voltage across the resistor 26.

Thus, according to the voltage difference detection circuit 301 in FIG. 3, there is an advantageous effect that owing to a circuit configuration simpler than that in FIG. 2, a similar function to that in FIG. 2 can be obtained, and a circuit scale can be reduced.

Although the embodiments of the present invention have been described above, the present invention is not limited to the above embodiments. It is needless to say that various changes can be made thereto within the scope not departing from the spirit of the present invention.

For example, when the ratio between the capacity of the secondary battery 1 and the capacity of the secondary battery 2 is 1:2, the ratio between the resistors 25 and 26 is set to 2:1, thereby making it possible to equalize the charging rates of the batteries.

What is claimed is:

1. A charge/discharge control circuit for controlling charging and discharging of a first secondary battery and a second secondary battery connected in parallel, comprising:
   a positive power supply terminal to which positive terminals of the first secondary battery and the second secondary battery are connected;
   a first negative power supply terminal to which a negative terminal of the first secondary battery is connected;
   a second negative power supply terminal to which a negative terminal of the second secondary battery is connected;
   a first charge control terminal from which a signal controlling the charging of the first secondary battery is output;
   a second charge control terminal from which a signal controlling the charging of the second secondary battery is output;
   a voltage monitor terminal connected to an external negative terminal to which negative electrodes of a load and a charger are connected;
   a first voltage input terminal connected to one end of a first resistor through which a current of the first secondary battery flows, the first resistor having another end connected to the external negative terminal;
   a second voltage input terminal connected to one end of a second resistor through which a current of the second secondary battery flows, the second resistor having another end connected to the external negative terminal;
   a voltage detection circuit configured to output a control signal controlling the charging and discharging according to voltages of the positive power supply terminal, the first negative power supply terminal, and the second negative power supply terminal;
   a differential amplifier having a first input terminal to which the first voltage input terminal is connected, and a second input terminal to which the second voltage input terminal is connected;
   an output circuit which has an input terminal to which an output terminal of the differential amplifier is connected, and configured to output a first signal supplied to the first charge control terminal and a second signal supplied to the second charge control terminal; and
   a charge control circuit configured to output the first and second signals to the first charge control terminal and the second charge control terminal respectively, based on the first and second signals supplied from the output circuit and the control signal supplied from the voltage detection circuit,
   wherein according to a reception of a control signal to permit the charging from the voltage detection circuit and a detection based on a voltage of the voltage monitor terminal that the charger is connected, the charge control circuit outputs the first signal supplied by the output circuit to the first charge control terminal and outputs the second signal supplied by the output circuit to the second charge control terminal.

2. A battery apparatus comprising:
   the first secondary battery and the second secondary battery connected in parallel;
   the charge/discharge control circuit according to claim 1 which controls charging and discharging of the first secondary battery and the second secondary battery;
   a first charge control FET which controls the charging of the first secondary battery, and which is controlled by the charge/discharge control circuit; and
   a second charge control FET which controls the charging of the second secondary battery, and which is controlled by the charge/discharge control circuit.

3. A charge/discharge control circuit for controlling charging and discharging of a first secondary battery and a second secondary battery connected in parallel, comprising:
   a positive power supply terminal to which positive terminals of the first secondary battery and the second secondary battery are connected;

a first negative power supply terminal to which a negative terminal of the first secondary battery is connected;
a second negative power supply terminal to which a negative terminal of the second secondary battery is connected;
a first charge control terminal from which a signal controlling the charging of the first secondary battery is output;
a second charge control terminal from which a signal controlling the charging of the second secondary battery is output;
a voltage monitor terminal connected to an external negative terminal to which negative electrodes of a load and a charger are connected;
a first voltage input terminal connected to one end of a first resistor through which a current of the first secondary battery flows, the first resistor having another end connected to the first negative power supply terminal;
a second voltage input terminal connected to one end of a second resistor through which a current of the second secondary battery flows, the second resistor having another end connected to the second negative power supply terminal;
a voltage detection circuit configured to output a control signal controlling the charging and discharging according to voltages of the positive power supply terminal, the first negative power supply terminal, and the second negative power supply terminal;
a first differential amplifier having a first input terminal to which the first negative power supply terminal is connected, and a second input terminal to which the first voltage input terminal is connected;
a second differential amplifier having a first input terminal to which the second negative power supply terminal is connected, and a second input terminal to which the second voltage input terminal is connected;
an addition circuit configured to output a difference between an output voltage of the first differential amplifier and an output voltage of the second differential amplifier;
an output circuit which has an input terminal to which an output terminal of the addition circuit is connected, and configured to output a first signal supplied to the first charge control terminal and a second signal supplied to the second charge control terminal; and
a charge control circuit configured to output the first and second signals to the first charge control terminal and the second charge control terminal respectively, based on the first and second signals supplied from the output circuit and the control signal supplied from the voltage detection circuit,
wherein according to a reception of a control signal to permit the charging from the voltage detection circuit and a detection based on a voltage of the voltage monitor terminal that the charger is connected, the charge control circuit outputs the first signal supplied by the output circuit to the first charge control terminal and outputs the second signal supplied by the output circuit to the second charge control terminal.

4. A battery apparatus comprising:
the first secondary battery and the second secondary battery connected in parallel;
the charge/discharge control circuit according to claim 3 which controls charging and discharging of the first secondary battery and the second secondary battery;
a first charge control FET which controls the charging of the first secondary battery, and which is controlled by the charge/discharge control circuit; and
a second charge control FET which controls the charging of the second secondary battery, and which is controlled by the charge/discharge control circuit.

5. A charge/discharge control circuit for controlling charging and discharging of a first secondary battery and a second secondary battery connected in parallel, comprising:
a positive power supply terminal to which positive terminals of the first secondary battery and the second secondary battery are connected;
a first negative power supply terminal to which a negative terminal of the first secondary battery is connected;
a second negative power supply terminal to which a negative terminal of the second secondary battery is connected;
a first charge control terminal from which a signal controlling the charging of the first secondary battery is output;
a second charge control terminal from which a signal controlling the charging of the second secondary battery is output;
a voltage monitor terminal connected to an external negative terminal to which negative electrodes of a load and a charger are connected;
a first voltage input terminal connected to one end of a first resistor through which a current of the first secondary battery flows, the first resistor having another end connected to the first negative power supply terminal;
a second voltage input terminal connected to one end of a second resistor through which a current of the second secondary battery flows, the second resistor having another end connected to the second negative power supply terminal;
a voltage detection circuit configured to output a control signal controlling the charging and discharging according to voltages of the positive power supply terminal, the first negative power supply terminal, and the second negative power supply terminal;
a voltage difference detection circuit having a first output terminal to which one end of a first resistor and one end of a second resistor are connected, and having a second output terminal to which one end of a third resistor and one end of a fourth resistor are connected, the first resistor having another end connected to the first negative power supply terminal, the second resistor having another end connected to the second voltage input terminal, the third resistor having another end connected to the second negative power supply terminal, and the fourth resistor having another end connected to the first voltage input terminal;
a differential amplifier having a first input terminal to which the first output terminal is connected, and a second input terminal to which the second output terminal is connected;
an output circuit which has an input terminal to which an output terminal of the differential amplifier is connected, and configured to output a first signal supplied to the first charge control terminal and a second signal supplied to the second charge control terminal; and
a charge control circuit configured to output the first and second signals to the first charge control terminal and the second charge control terminal respectively, based on the first and second signals supplied from the output circuit and the control signal supplied from the voltage detection circuit, wherein according to a reception of a control signal to permit the charging from the voltage detection circuit and a detection based on a voltage of the voltage monitor terminal that the charger is connected, the charge control circuit outputs the first signal supplied by the output circuit to the first charge control terminal and outputs the second signal supplied by the output circuit to the second charge control terminal.

6. A battery apparatus comprising:

the first secondary battery and the second secondary battery connected in parallel;

the charge/discharge control circuit according to claim 5 which controls charging and discharging of the first secondary battery and the second secondary battery;

a first charge control FET which controls the charging of the first secondary battery, and which is controlled by the charge/discharge control circuit; and a second charge control FET which controls the charging of the second secondary battery, and which is controlled by the charge/discharge control circuit.

* * * * *